(No Model.) 4 Sheets—Sheet 1.

R. H. NORTH.
CASH RECORDER FOR STORE SERVICE.

No. 435,241. Patented Aug. 26, 1890.

Witnesses
H. C. Newman
Louis G. Julihn

Inventor
Ralph H. North
By his Attorneys
Hopkins & Atkins

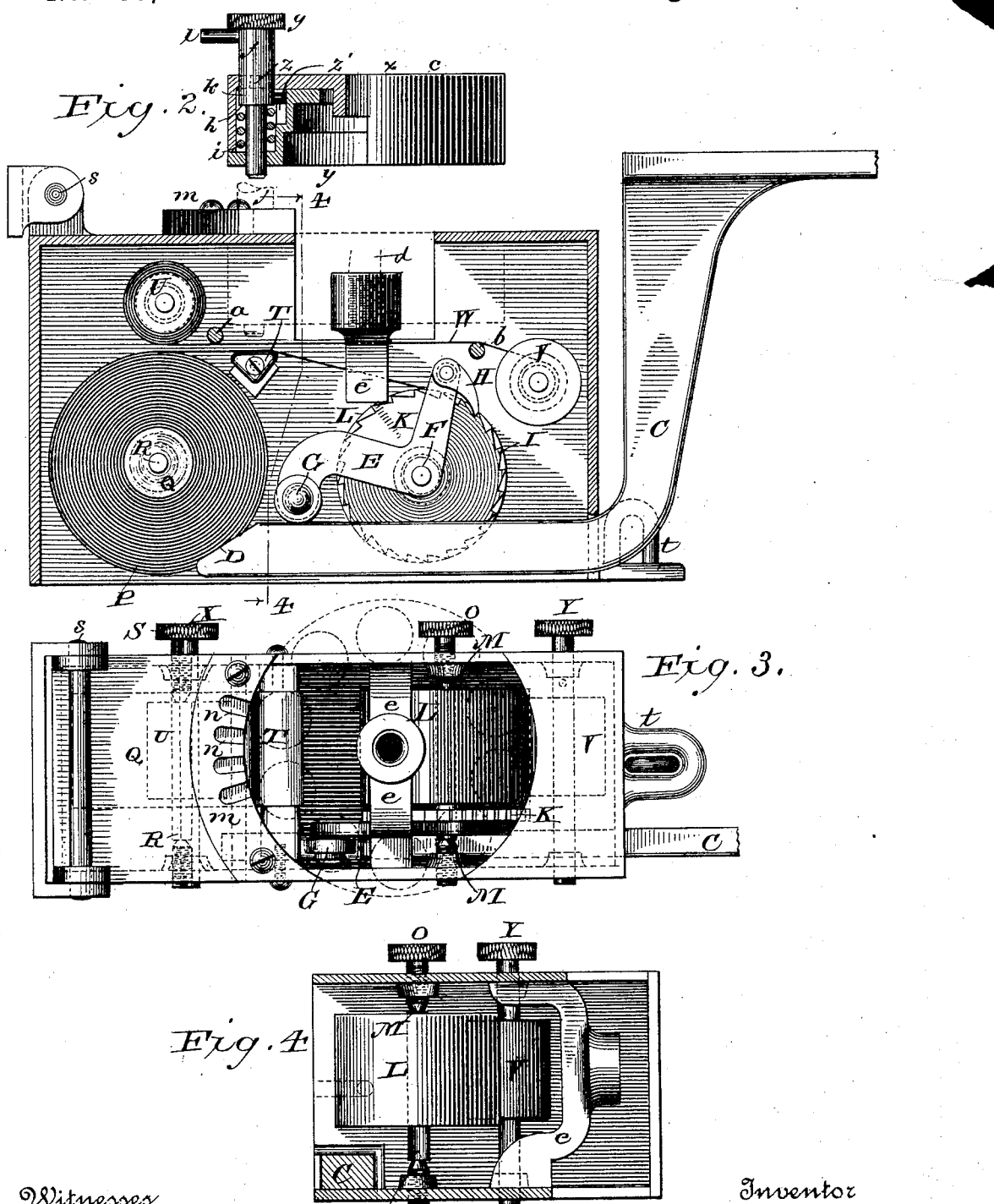

(No Model.) 4 Sheets—Sheet 3.

R. H. NORTH.
CASH RECORDER FOR STORE SERVICE.

No. 435,241. Patented Aug. 26, 1890.

Witnesses
H. C. Newman.
Louis S. Julihn.

Inventor
Ralph H. North,
By his Attorneys
Hopkins and Atkins

THE NORRIS PETERS CO., PHOTO-LITHO., WASHINGTON, D. C.

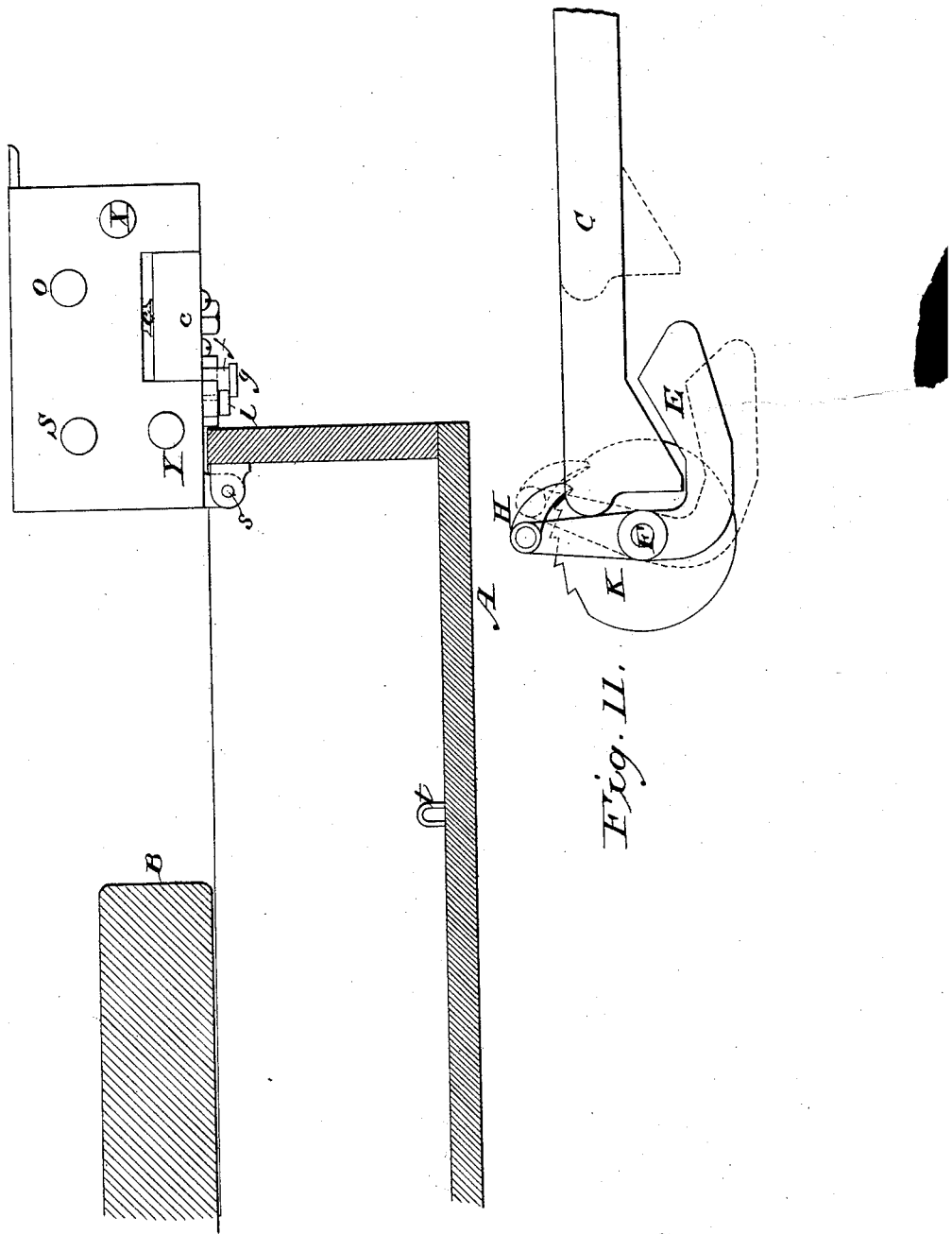

UNITED STATES PATENT OFFICE.

RALPH H. NORTH, OF PHILADELPHIA, PENNSYLVANIA.

CASH-RECORDER FOR STORE-SERVICE.

SPECIFICATION forming part of Letters Patent No. 435,241, dated August 26, 1890.

Application filed September 28, 1889. Serial No. 325,389. (No model.)

*To all whom it may concern:*

Be it known that I, RALPH H. NORTH, of Philadelphia, in the county of Philadelphia and State of Pennsylvania, have invented certain new and useful Improvements in Cash-Recorders for Store-Service, &c., of which the following is a specification, reference being had to the accompanying drawings.

Cash registers and recorders are usually quite complicated and expensive, and they are therefore not extensively used among small dealers.

The object of my invention is to provide a simple and comparatively inexpensive cash-recorder adapted to be connected with an ordinary cash-drawer and to record upon a strip of paper the amount of each sale, so that the record may not only serve for the day, but may be removed from the machine and filed away for reference. I provide for automatically moving the strip of paper to be printed upon by the operation of sliding the drawer, so that every time the drawer is operated there should appear a record of cash deposited; otherwise a blank will be left on the paper, indicating that something irregular has transpired. I prefer to place my recording apparatus within a cash-drawer; but of course that is not essential.

Figure 1:
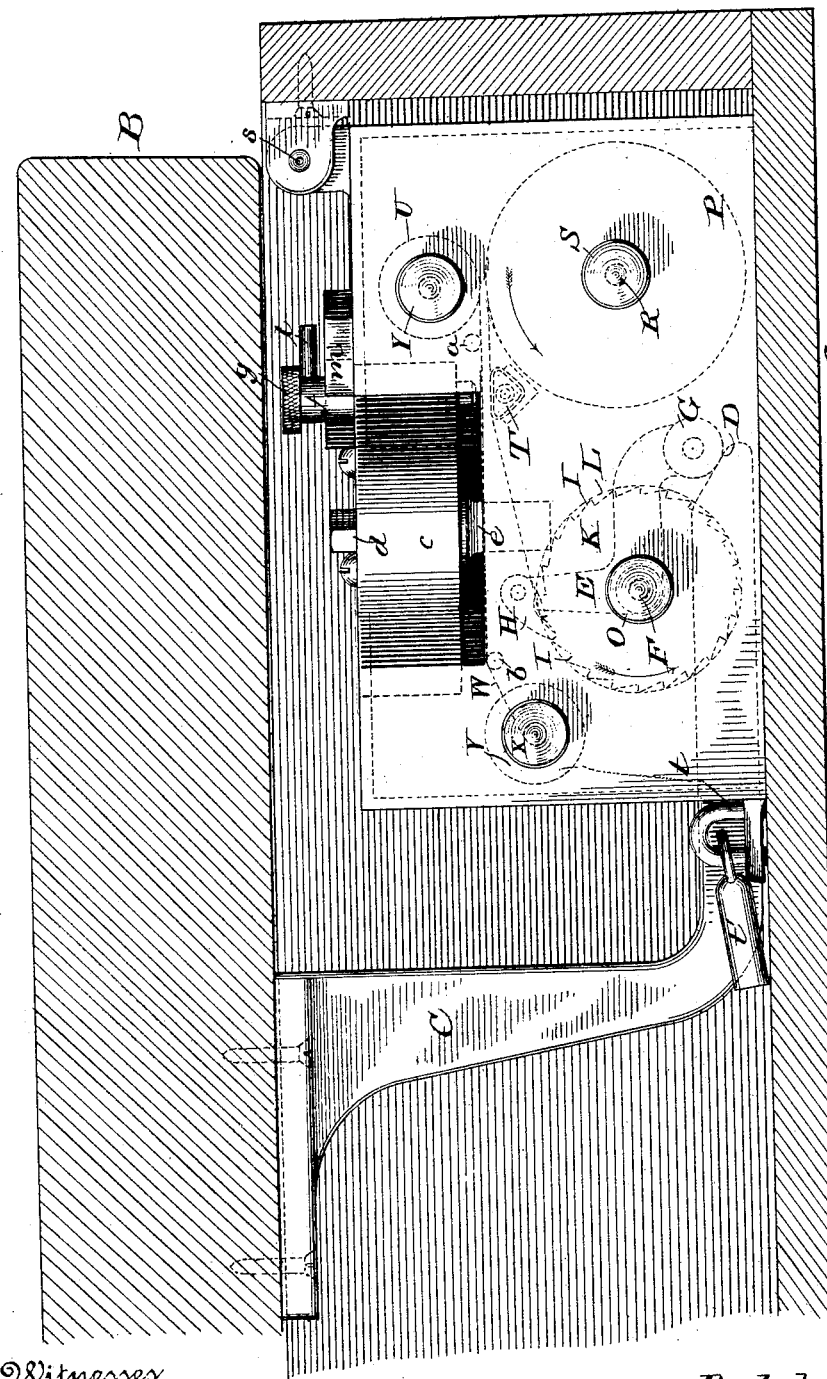
Figure 5:
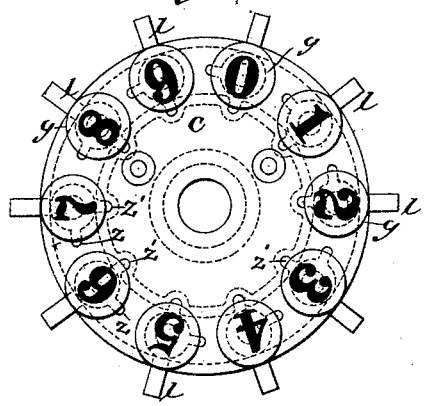
Figure 8:
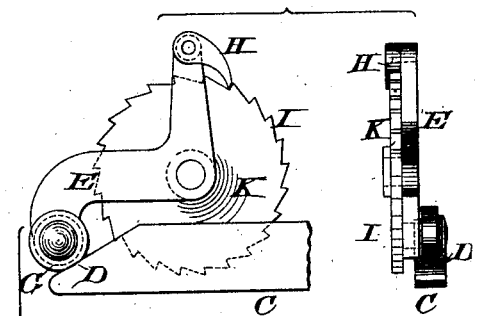
Figure 7:
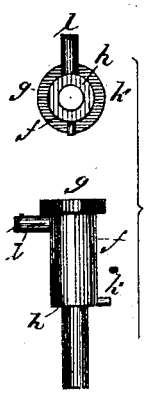
Figure 6:
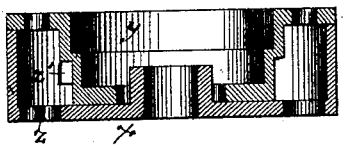
Figure 9:
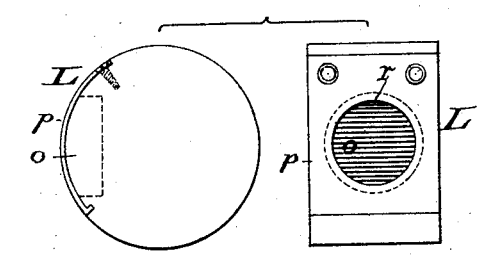

In the accompanying drawings, illustrating one form of embodiment of my invention, which I deem the best, Figure 1 is a vertical section through the top of a counter and through a cash-drawer containing my improved recording apparatus, which is shown in side elevation. Fig. 2 is a side elevation of my improved recording apparatus, one side of the case being removed, in order to exhibit the internal mechanism. In this figure the turret is shown above its normal position and apart from the rest of the mechanism for better illustration, the dotted lines at the top of the main figure indicating its normal position. Fig. 3 is a plan view of my improved apparatus with the turret removed, its position, however, being indicated by dotted lines. Fig. 4 is a vertical section on line 4 4 of Fig. 2, the pawl, ratchet, and bell-crank lever being omitted. Fig. 5 is a plan view of the turret. Fig. 6 is a diametrical section of the turret stripped of its attached parts and upside down. Fig. 7 is a group showing the plungers in different positions detached from the turret and exhibiting their details of construction. Fig. 8 is another group showing the ratchet and pawl and cam mechanism detached and in different positions. Fig. 9 is another group showing one of the paper-holding drums detached and in different positions to exhibit details of construction. Fig. 10 is a view showing the drawer open and the recorder turned back on its hinge. Fig. 11 is a view of pawl-and-ratchet mechanism and cam and bell-crank arranged to work in the opposite direction so that the opening of the cash-drawer will operate them; but this is only an illustration of one formal change that is of course practicable, though not, I think, generally desirable.

The paper-feeding mechanism may be otherwise varied, the essential thing being only to have an automatic feed mechanism for the paper operated by the sliding of a drawer or similar movement.

Referring to the letters upon the drawings, A indicates an ordinary cash-drawer in place and working under the back side of a counter, of which a section of the top is shown at B in Figs. 1 and 10.

C indicates an arm, in this instance secured to the under side of the top of the counter and projecting downward within the cash-drawer. This arm is beveled on its end to form a cam-surface D, which serves to operate a bell-crank lever E, pivoted to the shaft F, preferably carrying an anti-friction wheel G on its end, which bears against the cam-surface D. On its other end is pivoted a pawl H, which is arranged to engage with the ratchet-teeth I of a wheel K, secured to the shaft F. This shaft carries a take-up paper-roller L, and preferably has pivot-bearings in sockets at M, one of which bearings is provided with a thumb-nut O for adjustment.

P indicates a roll of paper upon another roller Q on another shaft R, also having pivot-bearings, one of them being provided with a thumb-nut S.

Observing the structure and relation of the parts just described, it will be seen that whenever the cash-drawer is closed the anti-friction wheel G will impinge against the cam-surface D and operate the bell-crank lever and pawl-and-ratchet mechanism to move the take-up roller L a small part of a revolution, so that a blank surface of the paper will be moved along in position to be printed upon.

T indicates an anvil arranged so that the paper extending from one roller to the other will always bear gently on its surface and be in place to receive an impression. Of course the diameter of the rolls of paper will constantly vary in practice, that of the supply-roller constantly diminishing and that of the take-up roller constantly increasing. In order to prevent this variation from affecting the proper relation of the paper to the anvil, I place the anvil in such a position that when the supply-roller is filled the paper will still bear upon the surface of the anvil. In that position it will be high enough so that when the take-up roller becomes filled the paper extending between the rollers will still bear upon the surface of the anvil properly.

U indicates a supply ribbon-spool, and V a take-up ribbon-spool for carrying an ordinary ink-ribbon W. These spools are each provided with thumb-nuts X and Y for their manipulation. The diameters of the rolls of ink-ribbon upon the spools U and V will of course constantly vary in practice by the ribbon being wound from one spool onto the other, as just explained with reference to the paper-rollers. It is desirable, however, to have the ink-ribbon extending between the two spools always occupy the same relation to the paper over the anvil, so that good printing can be done. To secure this result, I provide a guide-rod or anti-friction roller $a$, located above the ink-ribbon near the ink-ribbon-supply spool, and another one $b$, located below the ink-ribbon near the ink-ribbon-take-up spool. I thus guide the ink-ribbon extending between its two spools so that between the two guides it will always move on a horizontal plane just above the surface of the paper over the anvil. It will be easy to gear the ink ribbon rollers with the paper-rollers, so that the ink-ribbon shall be fed automatically, like the strip of paper; but in practice by employing a good quality of ink-ribbon such automatic movement of the ink-ribbon will not be found to be desirable as a rule. Therefore I have not shown the rollers and spools as geared together, and I prefer, generally, not to have them work in that way, but to have the ink-ribbon fed along by manipulation with thumb-nuts, as may be required.

In order to print numbers upon the strip of paper, so as to record amounts of sales as made, I provide a revolving turret or plunger-carrier $c$, working upon a vertical shaft $d$, fixed to an arch $e$, which may be cast with or fixed to the case A. This turret carries ten similar vertical plungers $f$, arranged in bearings in a circle near its periphery, and each provided with a cap $g$, these caps being numbered, respectively, 1 2 3 4 5 6 7 8 9 0. The plungers are provided at their lower ends with type adapted to print corresponding numbers.

The turret or carrier for these plungers, preferably circular and composed of two castings $x$ and $y$, is shown in Fig. 6 turned upside down, which is the position most convenient for putting the plungers and the two parts of the turret together. Of course a sliding instead of a rotating carrier might be used; but it would not be desirable.

$h$ indicates an annular shoulder upon each plunger, around the smaller part of which and beneath the shoulder is a coiled spring $i$, which bears at its lower part upon the turret and tends to keep the plunger elevated, as shown in Fig. 2.

$k$ is a stop-pin projecting from and designed to limit the upward movement and prevent rotary movement of each plunger and to keep the spring from throwing it out of place. The plungers may be inserted into the openings in the part $x$ of the turret, a recess $z$ being provided to admit a stop-pin projecting from each plunger. As soon as each plunger is in place it can be turned a little, so that the stop-pin just referred to can enter the recess $z'$ in the part $y$ of the turret and bear against the part $x$ and keep the plunger in place. After the plungers are placed in position and the part $x$ is turned upside down, the part $y$ is then put in position, and the plungers will be securely held; but these details are not of the substance of my invention, and may be varied, like many others herein referred to.

$l$ is a guide pin or lug projecting from the side of each plunger above the turret and in a line with the radius of the turret.

$m$ is a curved plate secured to the case in juxtaposition to the circular side of the turret, which has guide-slots $n$ in line with the radius of the turret and adapted to receive the guide pins or lugs $l$.

$o$ in Fig. 9 indicates a recess cut in the surface of the paper-roller and covered by a spring paper-holder $p$, secured to the roller, it may be, at one end with screws and adapted to clamp the end of the strip of paper at its other end between it and the surface of the roller. This spring has an opening $r$ through it, by which it may be lifted up for the purpose of inserting the end of a strip of paper.

I prefer to hinge the case containing my recording apparatus to the drawer, as at $s$ in Figs. 1, 2, 3, and 10, so that it may be turned outward and bottom upward, as indicated in Fig. 10, for inspection, adjustment, or withdrawal of the record.

$t$ indicates a hasp, and $t'$ a padlock, for securing the case in position in the drawer.

Suppose the ink-ribbon and strip of paper to be in place and the drawer open. The clerk or attendant having made a sale and received the right amount puts it in the cash-drawer and then prints the number corresponding to the amount upon the paper strip by depressing one or more of the plungers. After this is done he closes the drawer, which act causes the rotation of the paper-holding rollers and the feeding forward of the strip of paper over the anvil so as to present a blank space for another impression. The closing of the drawer brings the parts into the position shown in Fig. 2. Now if the clerk or attendant has failed to print a number there will be left a blank space upon the paper, which the apparatus will never fill. In this way such an irregularity is sure to be detected. Again, should a clerk or attendant print a number not corresponding to the amount of change placed in the cash-drawer, then the cash and the record of it will not balance, so that irregularity will always be detected.

It will be well in practice to apply a bell of ordinary kind, as is usual, to the cash-drawer, so that the proprietor can note when the drawer is open and judge whether the succeeding sound at its closing indicates that it has been closed as promptly as it should be.

What I claim as new, and desire to secure by Letters Patent, is—

1. In a cash-recorder, the combination, with a cash-drawer, of hand printing mechanism arranged to be worked after the drawer has been opened, rollers carrying paper, and paper-feeding mechanism so arranged that the paper will be fed along to be ready for printing after the drawer is opened, substantially as set forth.

2. In a cash-recorder, the combination, with the cash-drawer, of a cam-arm, and rollers carrying paper, paper-feeding mechanism connected with the cam-arm and paper-carrying rollers whereby the paper may be fed, an anvil under the paper, a printing-ribbon over the paper, and one or more plungers for printing after the drawer has been opened upon the blank spaces on the paper presented over the anvil by the operation of the paper-feeding mechanism, substantially as set forth.

3. The combination, with the revolving turret, of the vertical spring-plungers, each provided with a guide-lug, and the curved plate $m$, provided with the guide-slots $n$, substantially as set forth.

In testimony of all which I have hereunto subscribed my name.

RALPH H. NORTH.

Witnesses:
JAMES FOTHERINGHAM,
THOMAS J. FEGLEY.